US012448692B2

(12) United States Patent
Magori et al.

(10) Patent No.: US 12,448,692 B2
(45) Date of Patent: Oct. 21, 2025

(54) METHOD FOR FASTENING AN ELECTRODE

(71) Applicant: Siemens Energy Global GmbH & Co. KG, Bayern (DE)

(72) Inventors: Erhard Magori, Feldkirchen (DE); Remigiusz Pastusiak, Munich (DE); Angelika Tawil, Munich (DE); Kerstin Wiesner-Fleischer, Höhenkirchen-Siegertsbrunn (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 525 days.

(21) Appl. No.: 17/919,257

(22) PCT Filed: Apr. 21, 2021

(86) PCT No.: PCT/EP2021/060392
§ 371 (c)(1),
(2) Date: Oct. 15, 2022

(87) PCT Pub. No.: WO2021/239338
PCT Pub. Date: Dec. 2, 2021

(65) Prior Publication Data
US 2023/0193484 A1 Jun. 22, 2023

(30) Foreign Application Priority Data
May 25, 2020 (DE) .................... 10 2020 206 449.0

(51) Int. Cl.
C25B 9/63 (2021.01)
C25B 1/23 (2021.01)
(Continued)

(52) U.S. Cl.
CPC ................. *C25B 9/63* (2021.01); *C25B 1/23* (2021.01); *C25B 3/26* (2021.01); *C25B 9/19* (2021.01); *C25B 9/65* (2021.01)

(58) Field of Classification Search
CPC .... C25B 9/63; C25B 1/23; C25B 3/26; C25B 9/19; C25B 9/65
See application file for complete search history.

(56) References Cited

U.S. PATENT DOCUMENTS 4,732,660 A 3/1988 Plowman
6,984,296 B1 1/2006 Gestermann
(Continued)

FOREIGN PATENT DOCUMENTS

DE 19954247 A1 5/2000
DE 19959079 A1 6/2001
(Continued)

OTHER PUBLICATIONS

International Search Report and Written Opinion of the International Searching Authority mailed Aug. 3, 2021 corresponding to PCT Application No. PCT/EP2021/060392 filed Apr. 21, 2021.

Primary Examiner — Ciel P Contreras
(74) Attorney, Agent, or Firm — Wolter Van Dyke Davis, PLLC

(57) ABSTRACT

A method for arranging an electrochemically active element on a fastening device which has a first holder with at least one cylindrical spacing element and has a second holder with at least one cylindrical spacing element, including: a) providing an electrochemically active element whose electrolyte side can be arranged to adjoin an electrolyte chamber and whose gas side can be arranged to adjoin a gas chamber of an electrochemical cell; b) arranging the at least one spacing element of the first holder on the gas side and arranging the at least one spacing element of the second holder on the electrolyte side of the electrochemically active
(Continued)

element, the at least one spacing element on the electrolyte side being aligned axially with respect to the at least one spacing element on the gas side. An electrochemical cell in which an electrochemically active element is arranged on a fastening device.

11 Claims, 3 Drawing Sheets

(51) Int. Cl.
  *C25B 3/26*  (2021.01)
  *C25B 9/19*  (2021.01)
  *C25B 9/65*  (2021.01)

(56) References Cited

U.S. PATENT DOCUMENTS

| | | |
|---|---|---|
| 7,329,331 B2 | 2/2008 | Bulan |
| 11,136,677 B2 | 10/2021 | Bulan |
| 2003/0155232 A1 | 8/2003 | Katayama |
| 2018/0230612 A1 | 8/2018 | Krause |
| 2020/0291537 A1 | 9/2020 | Jeanty |

FOREIGN PATENT DOCUMENTS

| | | |
|---|---|---|
| DE | 102010054159 A1 | 6/2012 |
| DE | 102015215309 A1 | 2/2017 |
| EP | 1067216 A1 | 1/2001 |
| WO | 03031690 A2 | 4/2003 |
| WO | 2019091703 A1 | 5/2019 |

METHOD FOR FASTENING AN ELECTRODE

CROSS REFERENCE TO RELATED APPLICATIONS

This application is the US National Stage of International Application No. PCT/EP2021/060392 filed 21 Apr. 2021, and claims the benefit thereof. The International Application claims the benefit of German Application No. DE 10 2020 206 449.0 filed 25 May 2020. All of the applications are incorporated by reference herein in their entirety.

FIELD OF INVENTION

The invention relates to a method of arranging an electrochemically active element, to an electrochemical cell having a securing unit, and to the use of a securing unit for arranging an electrochemically active element in an electrochemical cell.

BACKGROUND OF INVENTION

Gas diffusion electrodes are electrodes having a combination of a solid, liquid and gaseous interface and an electrically conductive catalyst that promotes an electrochemical reaction between the liquid phase and the gaseous phase.

Gas diffusion electrodes are used, for example, in electrochemical cells for carbon dioxide electrolysis, in which carbon dioxide is reduced at the gas diffusion electrode, with formation of water, to give products such as carbon monoxide, methane, ethylene or alcohols. For the performance of the desired chemical reaction in the electrochemical cell, the substances desired may either be in liquid form or in gaseous form. The gas diffusion electrode permits mutual contacting of a solid substance, a liquid substance and a gaseous substance, such that the desired electrochemical reaction can be achieved.

A gas diffusion electrode and a method of production thereof is known, for example, from DE 10 2015 215 309 A1. Typically, a catalyst is fixed in a porous film, such that the liquid and the gas can interact. As well as these wetting properties, the gas diffusion electrodes must offer optimal electrical conductivity in order to enable electron transport with low ohmic resistance. A gas conduction layer is present in the middle of the electrode. With just a low gas pressure, the electrolyte is displaced from this pore system. A low flow resistance ensures that the gas can flow freely within the electrode. In the case of an elevated gas pressure, the electrolyte will also be displaced from the pore system of the working layer. The surface layer has such fine pores that, even in the case of pressure peaks, no gas can flow through the electrode into the electrolyte.

Publication DE 199 59 079 A1 discloses an electrochemical cell having an anolyte space and a cathode space. Electrically conductive support elements are provided therein at identical opposite positions.

In order to maximize the electrochemically active surface area and hence to improve the conversion rate of the electrochemical cell, gas diffusion electrodes are usually formed as plates. For industrial use, therefore, electrodes having minimum build height and maximum electrode areas are advantageous.

A gas diffusion electrode is arranged in an electrochemical cell in such a way that it separates the gas space from the electrolyte space in a pressure-resistant manner. Since the inflow of gas results in a pressure differential acting on the gas diffusion electrode, this has to be braced by spacers to prevent it from bulging in the direction of the electrolyte space or to the other side in the direction of the gas space. Uncontrolled bulging of the gas diffusion electrode results in a decrease in the catholyte gap. This results in disruption to the electrolyte flow, associated with an inhomogeneous concentration distribution. Any gas bubbles that have passed through the gas diffusion electrode cannot escape unhindered and collect in front of spaces with a greatly reduced electrolyte gap. This leads to an increase in local current density in the remaining electrode area. The increase in local current densities results in formation of unwanted by-products. The effects described result in an increase in operating voltage depending on the increase in current density and hence to excess specific energy consumption.

It is regularly insufficient to secure solely the edges of the electrode in order to brace the electrode over its entire area at a constant small distance of a few millimeters from its counterelectrode, or in order to avoid mechanical overstress, predominantly as a result of differential pressure. It is therefore advantageous to brace the electrode over its area. If the pressure on the gas side is above the electrolyte pressure, bracing from the electrolyte side may be sufficient. Bracing of the gas diffusion electrode from the electrolyte side leads to a loss of active electrode area since the access of electrolyte and hence the flow of electrical current as well can be shadowed at the brace points. Bracing from the gas side leads to an increase in local current density in the remaining electrode area, resulting in formation of unwanted by-products, which the introduction of the bracing is specifically supposed to avoid.

SUMMARY OF INVENTION

It is an object of the present invention to enable an improved method of bracing the gas diffusion electrode by means of a securing unit.

The object is achieved in accordance with the invention by a method of arranging an electrochemically active element on a securing unit, by an electrochemical cell, and by the use of a securing unit for arranging an electrochemically active element in an electrochemical cell as claimed in the independent claims. Advantageous configurations with appropriate development of the invention are specified in the respective dependent claims, and advantageous configurations each aspect of the invention should be regarded as advantageous configurations of the respective other aspects of the invention.

A first aspect of the invention relates to a method of arranging an electrochemically active element on a securing unit having a first holding device having at least one cylindrical spacer element and a second holding device having at least one cylindrical spacer element, at least comprising the steps of a) providing an electrochemically active element that can be arranged with an electrolyte side adjoining an electrolyte space and with a gas side adjoining a gas space of an electrochemical cell; b) arranging the at least one spacer element of the first holding device on the gas side and arranging the at least one spacer element of the second holding device on the electrolyte side of the electrochemically active element, wherein the at least one spacer element on the electrolyte side is aligned axially with respect to the at least one spacer element on the gas side. In other words, according to the invention, a cylindrical spacer element is mounted locally on the gas side solely on the electrochemically active element when a cylindrical spacer element has likewise been arranged or is being arranged in the same position on the electrolyte side. This has the advantage that the arrangement of a spacer element on the gas side does not lead to additional shadowing of the electrochemically active element on the gas side. Such shadowing on the gas side leads to an increase in local current density in the remaining electrode area, with formation of unwanted by-products. Since the spacer elements on the gas side and the electrolyte side are in axial alignment and not offset relative to one another, there is no resultant additional loss of active electrode area.

The electrochemically active element is advantageously a gas diffusion electrode. The electrochemically active element may be a cathode or an anode; the electrochemically active element is preferably a cathode, optionally suitable for reduction of carbon dioxide.

The gas side is the side of the electrochemically active element facing a gas space. The electrolyte side is the side of the electrochemically active element facing an electrolyte space.

The spacer element is cylindrical. The spacer element is suitable for bracing of the electrochemically active element. A multitude of spacer elements may optionally be disposed in each case on the gas side and/or the electrolyte side of the electrochemically active element. For example, it is possible for 2, 3, 4, 5, 6, 7, 8, 9, 10 or more spacer elements to be disposed in each case on the gas side and/or the electrolyte side.

The at least one spacer element on the gas side may be joined by its side remote from the electrochemically active element to a housing element, for example a wall that bounds a cathode space.

In an advantageous configuration of the invention, the at least one spacer element on the gas side has a smaller contact area on the electrochemically active element than the at least one spacer element on the electrolyte side. The arrangement of a spacer element solely on the gas side leads to an increase in local current density in the remaining electrode area, with resultant formation of unwanted by-products. The arrangement of a spacer element on the electrolyte side leads to a loss of active electrode area since the access of electrolyte and hence also the flow of electrical current are shadowed at the brace points. If the spacer element on the gas side has a smaller contact area on the electrochemically active element, an increase in local current density in the remaining electrode area is avoided, and there is no resultant formation of unwanted by-products. A smaller contact area of the spacer element on the gas side is also advantageous in order to compensate for tolerances that possibly occur in the alignment of the spacer element on the gas side with respect to the spacer element on the electrolyte side.

In a further advantageous configuration of the invention, the at least one spacer element in each case is disposed on the electrochemically active element by means of adhesive bonding or welding. The fixing of the spacer elements is advantageous since an offset of the spacer elements relative to one another under mechanical stress, for example by flows of gas or electrolyte, is thus prevented.

In a further advantageous configuration of the invention, the electrochemically active element is also joined to the cathode space by means of lateral securing elements. The electrochemically active element may be joined to the lateral securing elements at its edge region. The lateral securing elements may take the form of clamps or optionally of a frame structure. In addition, the lateral securing elements may be designed in the form of electrical contacts for the electrochemically active element. In that case, the contacting of the electrochemically active element is on the gas side.

A second aspect of the invention relates to an electrochemical cell for carbon dioxide electrolysis and/or for carbon monoxide electrolysis, comprising a cathode space in which at least one cathode is arranged by means of a securing unit with an electrolyte side adjoining an electrolyte space and with a gas side adjoining a gas space, an anode space in which at least one anode galvanically coupled to the cathode is disposed, a separator for ion exchange between the cathode space and the anode space, wherein the securing unit has a first holding device having at least one spacer element and a second holding device having at least one spacer element, and wherein the at least one spacer element on the electrolyte side is aligned axially with respect to the at least one spacer element on the gas side. The securing unit prevents uncontrolled bulging of the electrochemically active element and the resulting disruption of electrolyte flow. Since the spacer elements on the gas side and the electrolyte side are aligned axially and not offset from one another, there is no additional loss of active electrode area. The arrangement of a spacer element on the gas side does not lead to any additional shadowing of the electrochemically active element on the gas side. Preferably, the arrangement of the securing unit is conducted by means of the method according to the first aspect of the invention. Further features and the advantages thereof can be inferred from the descriptions of the first aspect of the invention, and advantageous configurations of the first aspect of the invention should be considered to be advantageous configurations of the second aspect of the invention and vice versa.

In an advantageous configuration of the invention, the at least one spacer element disposed on the gas side comprises at least one electrically conductive material. The at least one spacer element disposed on the gas side advantageously consists of electrically conductive material. The conductive material is selected from the group comprising metals, semiconductors, carbon and polymers, and mixtures thereof. Polymers become conductive, for example, via additions of conductive material. Suitable additions include metal powders such as silver, copper, and carbon black, nanoparticles and mixtures thereof. This is advantageous since the spacer element on the gas side functions at least additionally as electrical contact.

In a further advantageous configuration of the invention, the at least one spacer element disposed on the gas side is coated with an electrochemically active composition. The material may be a polymer; advantageously, the material is selected from the group comprising acrylonitrile-butadiene-styrene (ABS), polyamide (PA), polylactate (PLA), polymethylmethacrylate (PMMA), polycarbonate (PC), polyethylene terephthalate (PET), polyethylene (PE), polypropylene (PP), polystyrene (PS), polyetheretherketone (PEEK) and polyvinylchloride (PVC), polyetheretherketones (PEEK) and combinations thereof. The material is especially advantageously PEEK. This is advantageous since the electrochemically active surface area is thus additionally increased by the at least one spacer element disposed on the gas side.

In a further advantageous configuration of the invention, the at least one spacer element disposed on the electrolyte side consists of electrically insulating material. The at least one spacer element disposed on the electrolyte side functions as an insulator; this avoids an unintended increase in local current densities.

In an advantageous configuration of the invention, the at least one spacer element is rounded at its end facing the electrochemically active element. This reduces the contact area of the spacer elements, and further loss of active electrode area can be avoided.

Further advantages arise in that the at least one spacer element in each case is spring-elastic. This reduces mechanical stress on the spacer elements by flows of gas or electrolyte, for example.

In an advantageous configuration of the invention, the first holding device and the second holding device also each have at least one holding element disposed on the at least one spacer element in each case. The holding element disposed on the at least one spacer element in each case increases the stability of the holding device. Especially when a multitude of spacer elements are disposed on the gas side or on the electrolyte side, these may be connected to one another by the at least one holding element and hence further stabilized.

In a further advantageous configuration of the invention, the at least one holding element comprises lamellas arranged in the form of a grid. The lamellas arranged in the form of a grid may be disposed on the at least one spacer element in each case on the gas side and/or on the electrolyte side. The arrangement of lamellas on the electrolyte side is advantageously smaller than on the gas side. This reduces or entirely prevents vortexing in the gas flow and electrolyte flow.

In addition, the electrochemically active element may be connected to the cathode space by means of lateral securing elements. The electrochemically active element may be connected to the lateral securing elements at its edge region. The lateral securing elements may be designed as clips or optionally as a frame structure. Moreover, the lateral securing elements may be designed as electrical contacts for the electrochemically active element. In that case, the electrochemically active element is contacted on the gas side.

A third aspect of the invention relates to the use of a securing unit for arrangement of an electrochemically active element on a securing unit in an electrochemical cell.

In an advantageous configuration of the invention, the electrochemically active element is arranged by means of the method of the invention.

Further features and advantages thereof can be inferred from the descriptions of the first and second aspects of the invention, and advantageous configurations of the first and second aspects of the invention should be regarded as advantageous configurations of the third aspect of the invention and vice versa.

Further features of the invention will be apparent from the claims, the figures and the description of the figures. Features and combinations of features mentioned above in the description, and the features and combinations of features mentioned below in the description of figures and/or shown in the figures alone, are usable not just in the respective combination specified but also in other combinations without leaving the scope of the invention. Thus, the invention is also considered to encompass and disclose executions that are not explicitly shown and elucidated in the figures but are apparent and can be created via separated combinations of features from the executions elucidated. Disclosed executions and combinations of features are also considered to include those that thus do not have all the features of an independent claim as originally formulated. In addition, disclosed executions and combinations of features, especially via the above-detailed executions, should be considered to include those that go beyond or differ from the combinations of features set out in the dependency references of the claims.

DETAILED DESCRIPTION OF INVENTION

Figure 1:
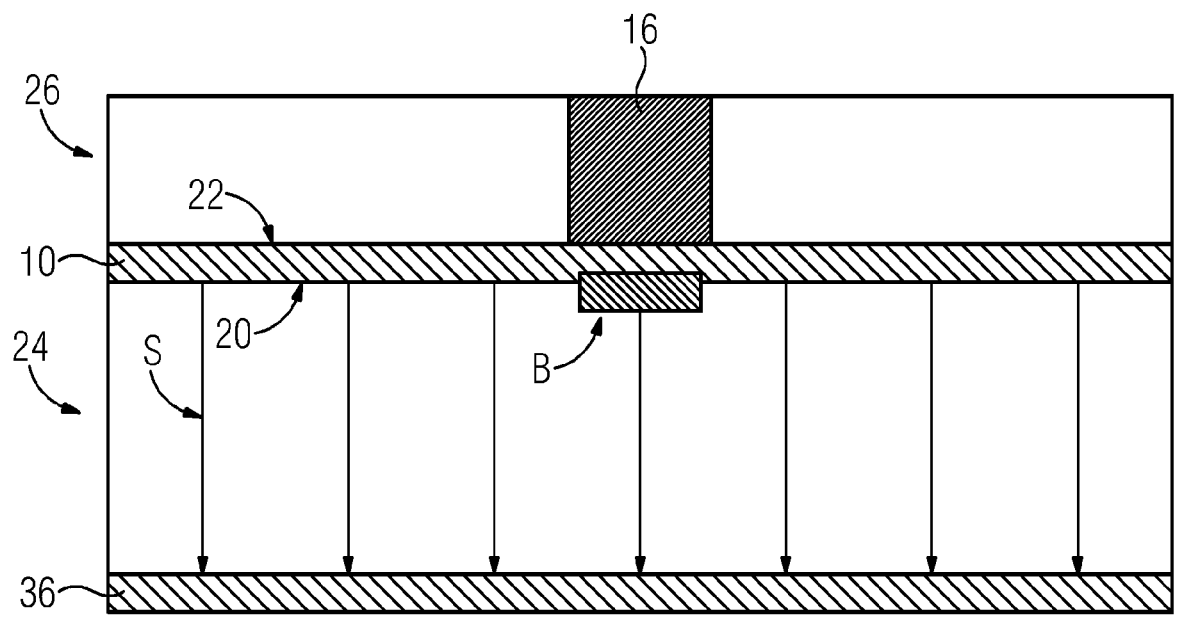
FIG. 1 a schematic diagram of a spacer element disposed on a gas side of an electrochemical element.

In FIG. 1, the spacer element 16 is disposed in the gas space 26 on the gas side 22 of the electrochemically active element 10. The bracing of the electrochemically active element 10 by the spacer element 16 on the gas side 22 brings about an altered current flow S through the electrolyte space 24 to the anode 36. This leads to a region of elevated current density B on the electrolyte side 20 beneath the spacer element 16. In the region of elevated current density B, there is formation of unwanted by-products such as hydrogen.

Figure 2:
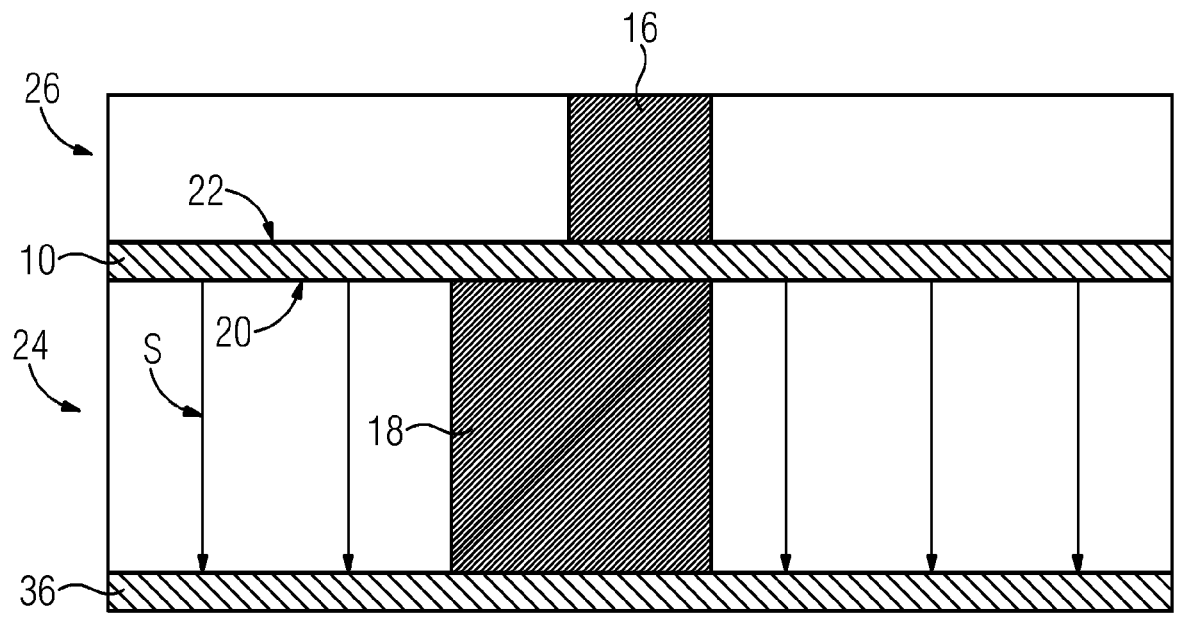
FIG. 2 a schematic diagram of an inventive arrangement of one spacer element on a gas side and one on an electrolyte side of an electrochemical element.

In FIG. 2, the spacer element 16 is disposed in the gas space 26 on the gas side 22 of the electrochemically active element 10. The spacer element 16 disposed on the gas side 22 is coated with an electrochemically active composition and additionally functions as electrical contact for the electrochemically active element 10, which additionally increases the electrochemically active surface area of the electrochemically active element 10. The spacer element 18 is disposed in the electrolyte space 24 on the electrolyte side 20 of the electrochemically active element 10, and consists of electrically insulating material. The spacer element 18 disposed on the electrolyte side 24 functions as insulator; this avoids an unwanted increase in local current densities on the electrolyte side 20 of the electrochemically active element 10. The spacer elements 16 and 18 are aligned axially and not offset from one another. This results in no additional loss of electrochemically active surface area on the electrochemically active element 10. The spacer element 16 on the gas side 22 has a smaller contact area on the electrochemically active element 10 than the spacer element 18 on the electrolyte side 20. The flow of current S through the electrolyte space 24 to the anode 36 is uniform; any increase in local current density in the remaining electrochemically active area is avoided and there is no formation of unwanted by-products. A smaller contact area of the spacer element 16 on the gas side 22 is also advantageous in order to compensate for tolerances that possibly occur in the alignment of the spacer element 16 on the gas side with respect to the spacer element 18 on the electrolyte side. The spacer element 16 on the gas side 22 and the spacer element 18 on the electrolyte side 20 of the electrochemically active element 10 may each be in a spring-elastic design. This reduces the mechanical stress on the spacer elements 16 and 18 by flows of gas or electrolyte, for example.

Figure 3:
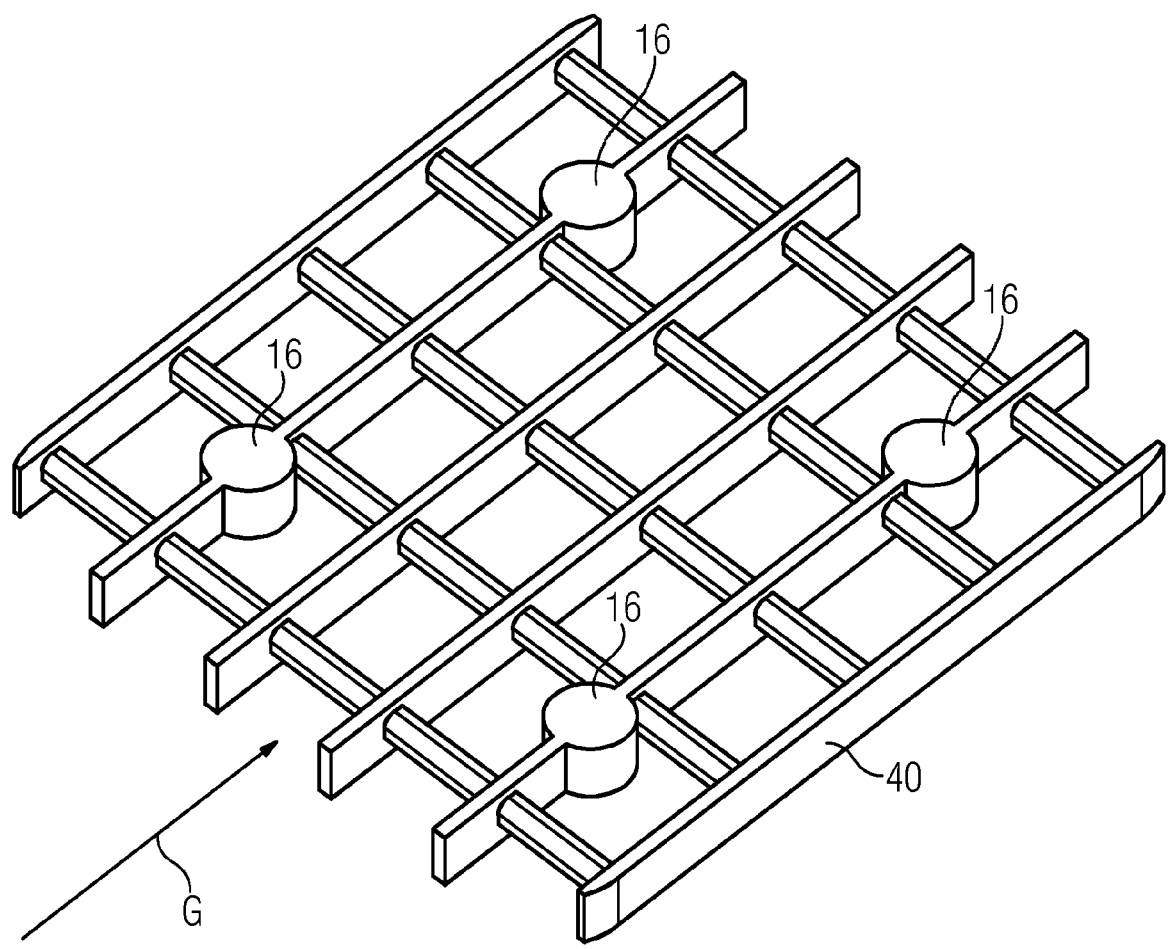
FIG. 3 a schematic diagram of a holding element of the invention.

In FIG. 3, four spacer elements 16 are connected to one another by the holding element 40. The four spacer elements 16 thus receive further stabilization. The holding element 40 is designed as lamellas arranged in the form of a grid. As a result, the gas stream G is uniform; vortexing in the gas stream is thus reduced or entirely avoided. The lamellas arranged in the form of a grid may be arranged adjoining the respective spacer elements 16 and 18 on the gas side 22 and on the electrolyte side 20 of the electrochemically active element 10. The arrangement of lamellas on the electrolyte side is advantageously smaller than on the gas side.

Figure 4:
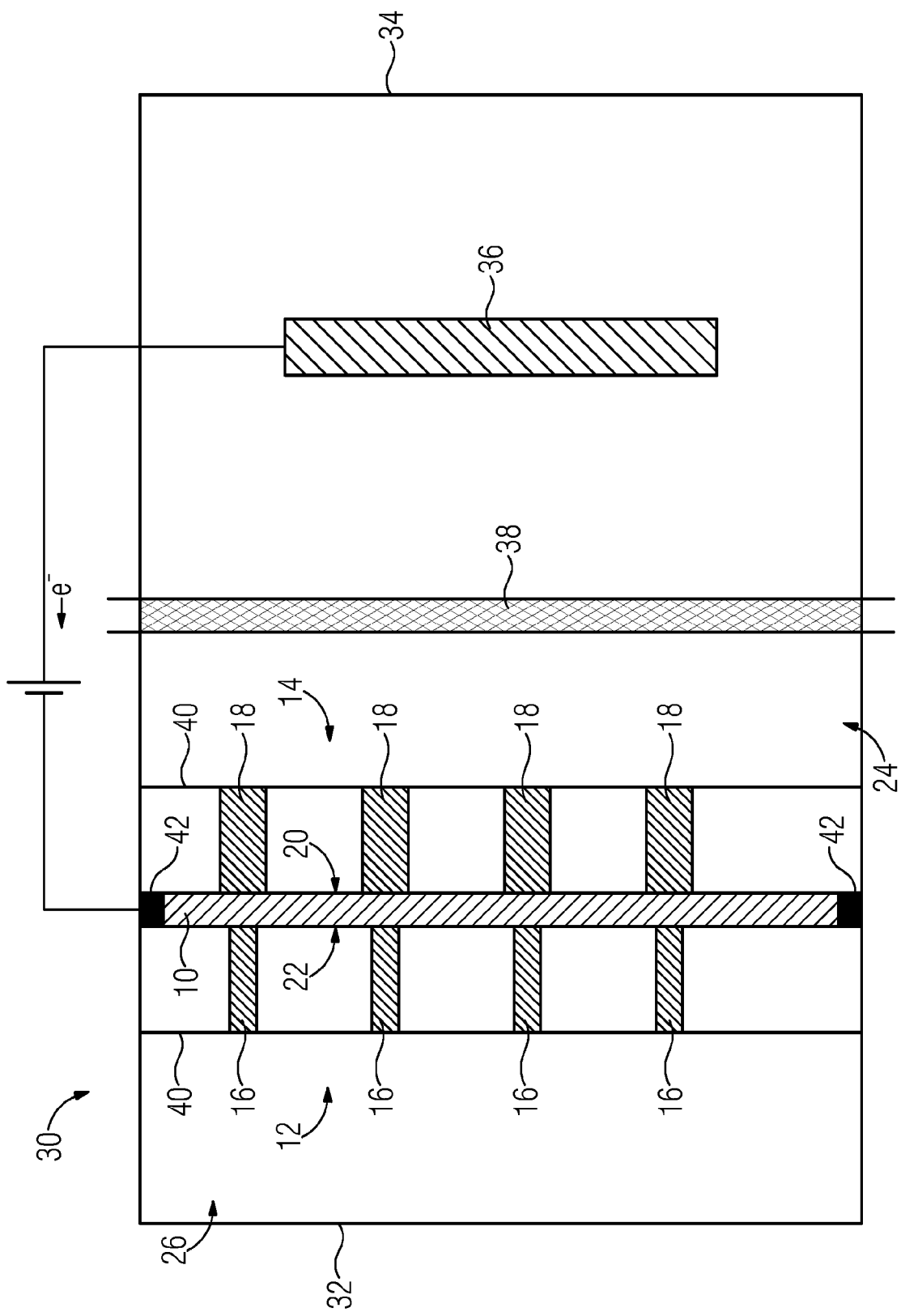
FIG. 4 a schematic section diagram of an electrochemical cell of the invention.

FIG. 4 shows the schematic section diagram of an electrochemical cell 30 for carbon dioxide electrolysis. The electrochemical cell 30 has a cathode space 32 in which the electrochemically active element 10 configured as cathode is disposed by means of a securing unit with the electrolyte side 20 adjoining the electrolyte space 24 and with the gas side 22 adjoining the gas space 26. The electrochemical cell 30 also has an anode space 34 in which there is disposed an anode 36 galvanically coupled to the electrochemically active element 10 configured as cathode. Cathode space 32 and anode space 34 are separated by a separator 38 for ion exchange between the cathode space 32 and the anode space 34.

The securing unit has a first holding device 12 having four spacer elements 16 on the gas side 22 of the electrochemical element 10. The spacer elements 16 are coated with an electrochemically active composition and additionally function as electrical contacts for the electrochemically active element 10. Furthermore, the electrochemically active surface area of the electrochemically active element 10 is additionally increased. The securing unit also has, on the electrolyte side 20 of the electrochemically active element 10, a second holding device 14 having four spacer elements 18. The spacer elements 18 are disposed in the electrolyte space 24 on the electrolyte side 20 of the electrochemically active element 10 and consist of electrically insulating material. The spacer elements 18 disposed on the electrolyte side 24 function as insulator; this avoids an unwanted increase in local current densities on the electrolyte side 20 of the electrochemically active element 10. The spacer elements 16 and 18 are each aligned axially and not offset from one another. This results in no additional loss of electrochemically active surface area on the electrochemically active element 10. The spacer elements 16 on the gas side 22 have a smaller contact area on the electrochemically active element 10 than the spacer elements 18 on the electrolyte side 20. The flow of current through the electrolyte space 24 to the anode 36 is uniform; any increase in local current density in the remaining electrochemically active area is avoided, and there is no resultant formation of unwanted by-products. A smaller contact area of the spacer elements 16 on the gas side 22 is also advantageous in order to compensate for tolerances that possibly occur in the alignment of the spacer element 16 on the gas side relative to the spacer elements 18 on the electrolyte side.

The spacer elements 16 and 18 are each connected to one another on the gas side 22 and the electrolyte side 20 by the holding elements 40. The spacer elements 16 and 18 thus each receive further stabilization. The holding elements 40 are executed as lamellas arranged in the form of a grid. Vortexing in the gas flow and electrolyte flow is thus reduced. The lamellas arranged in the form of grid (FIG. 3) are arranged adjoining the respective spacer elements 16 and 18 on the gas side 22 and on the electrolyte side 20 of the electrochemically active element 10. The holding elements 40 executed as lamellae arranged in the form of a grid are smaller on the electrolyte side than on the gas side.

In addition, the electrochemically active element 10 is connected to the cathode space 32 by means of lateral securing elements 42. The electrochemically active element 10 is connected at its edge to the lateral securing elements 42. The lateral securing elements 42 may be executed as brackets or as a frame structure. In addition, the lateral securing elements are designed as electrical contacts for the electrochemically active element 10.

The invention claimed is:

1. A method of arranging an electrochemically active element on a securing unit having a first holding device having at least one cylindrical spacer element and a second holding device having at least one cylindrical spacer element, comprising:
   a) providing an electrochemically active element that can be arranged with an electrolyte side adjoining an electrolyte space and with a gas side adjoining a gas space of an electrochemical cell;
   b) arranging the at least one cylindrical spacer element of the first holding device on the gas side and arranging the at least one cylindrical spacer element of the second holding device on the electrolyte side of the electrochemically active element, wherein the at least one cylindrical spacer element on the electrolyte side is aligned axially with respect to the at least one cylindrical spacer element on the gas side, wherein the at least one cylindrical spacer element on the gas side has a smaller contact area on the electrochemically active element than the at least one cylindrical spacer element on the electrolyte side.

2. The method as claimed in claim 1,
   wherein the at least one cylindrical spacer element is disposed on the electrochemically active element in each case by adhesive bonding or welding.

3. An electrochemical cell for carbon dioxide electrolysis and/or for carbon monoxide electrolysis, comprising:
   a cathode space in which at least one electrochemically active element configured as a cathode is arranged by a securing unit with an electrolyte side adjoining an electrolyte space and with a gas side adjoining a gas space,
   an anode space in which at least one anode galvanically coupled to the cathode is disposed,
   a separator for ion exchange between the cathode space and the anode space,
   wherein the securing unit has a first holding device having at least one cylindrical spacer element and a second holding device having at least one cylindrical spacer element, wherein the at least one cylindrical spacer element on the electrolyte side is aligned axially with respect to the at least one cylindrical spacer element on the gas side,
   wherein the at least one cylindrical spacer element on the gas side has a smaller contact area on the electrochemically active element than the at least one cylindrical spacer element on the electrolyte side.

4. The electrochemical cell as claimed in claim 3,
   wherein the at least one cylindrical spacer element disposed on the gas side comprises at least one electrically conductive material.

5. The electrochemical cell as claimed in claim 4,
   wherein the at least one cylindrical spacer element disposed on the gas side has been coated with an electrochemically active composition.

6. The electrochemical cell as claimed in claim 3,
   wherein the at least one cylindrical spacer element disposed on the electrolyte side consists of electrically insulating material.

7. The electrochemical cell as claimed in claim 3,
   wherein the at least one cylindrical spacer element in each case is rounded at its end facing the electrochemically active element.

8. The electrochemical cell as claimed in claim 3, wherein the at least one cylindrical spacer element in each case is spring-elastic.

9. The electrochemical cell as claimed in claim 3, wherein the first holding device and the second holding device also each have at least one holding element disposed on the at least one cylindrical spacer element in each case.

10. The electrochemical cell as claimed in claim 3, wherein the at least one holding element comprises lamellas arranged in the form of a grid.

11. The electrochemical cell as claimed in claim 3, wherein the electrochemically active element is connected to the cathode space by lateral securing elements.

* * * * *